United States Patent [19]
Okamoto et al.

[11] Patent Number: 6,146,774
[45] Date of Patent: Nov. 14, 2000

[54] SLIDING MEMBER, METHOD FOR TREATING SURFACE OF THE SLIDING MEMBER AND ROTARY COMPRESSOR VANE

[75] Inventors: Shinichi Okamoto; Yasushi Yamaguchi; Yoshiaki Kitagawa, all of Aichi, Japan

[73] Assignee: Taiho Kogyo Co., Ltd., Toyota, Japan

[21] Appl. No.: 09/155,108

[22] PCT Filed: Jan. 20, 1998

[86] PCT No.: PCT/JP98/00185

§ 371 Date: Sep. 21, 1998

§ 102(e) Date: Sep. 21, 1998

[87] PCT Pub. No.: WO98/31849

PCT Pub. Date: Jul. 23, 1998

[30] Foreign Application Priority Data

Jan. 20, 1997 [JP] Japan ..................................... 9-021036
Aug. 13, 1997 [JP] Japan ..................................... 9-231702

[51] Int. Cl.[7] ............................ C23C 18/36; C23C 18/31
[52] U.S. Cl. ......................... 428/652; 428/680; 384/912; 384/625; 427/438
[58] Field of Search ..................................... 428/652, 680; 384/912, 625; 427/438, 543, 556, 367

[56] References Cited

U.S. PATENT DOCUMENTS

| 4,042,382 | 8/1977 | Feldstein . |
| 5,897,965 | 4/1999 | Itoh et al. . |

FOREIGN PATENT DOCUMENTS

| 52-50733 | 12/1977 | Japan . |
| 55-49939 | 12/1980 | Japan . |
| 63-109182 | 5/1988 | Japan . |
| 63-312982 | 12/1988 | Japan . |
| 2-61024 | 3/1990 | Japan . |
| 4-78319 | 7/1992 | Japan . |
| 8-158058 | 6/1996 | Japan . |
| 8-290213 | 11/1996 | Japan . |
| 101 96 531 | 7/1998 | Japan . |
| 98/31849 | 7/1998 | WIPO . |

OTHER PUBLICATIONS

Surface Treatment Operation, Dec. 10, 1964, pp. 2–1 through 2–6. See Response filed herewith.

Electroless Plating, Dec. 10, 1984, pp. 92–99. See Response filed herewith.

*Primary Examiner*—Deborah Jones
*Assistant Examiner*—Jason Savage
*Attorney, Agent, or Firm*—Armstrong, Westerman, Hattori, McLeland & Naughton

[57] ABSTRACT

A medium-P/high-P type Ni—P plating coating, the hardness of which can be furthermore enhanced by heat treating, is used for plating on the surface of a sliding member. However, its wear resistance does not arrive at the desired level. In addition, although the P content of the conventional Ni—P—B electroless plating coating is lower than that of Ni—P electroless plating coating, P considerably disordered the crystallinity of Ni crystals and hence impaired the sliding characteristics. There is provided as a Ni—P—B electroless plating coating, which can eliminate the above described problems, a plating coating containing from 0.05 to 5% by weight of P and from 0.01 to 0.05% by weight of B. Furthermore, barrel polishing, shot blasting, laser-beam irradiation, high-frequency induction heating and the like are applied to the plating coating.

49 Claims, 8 Drawing Sheets

6,146,774

SLIDING MEMBER, METHOD FOR TREATING SURFACE OF THE SLIDING MEMBER AND ROTARY COMPRESSOR VANE

TECHNICAL FIELD

The present invention relates to a sliding member used under high load, which is brought into one-sided contact and to which a local load is applied, such as the vane of a rotary-type compressor, differential gear, washer of the transmission, and the like. More particularly, the present invention relates to a sliding member, in which the aluminum alloy used as its material is subjected to surface treatment for the purpose of enhancing the sliding characteristics. In addition, the present invention relates to the surface treatment method of an aluminum alloy.

BACKGROUND TECHNIQUE

In order to reduce the weight of the above-described compressor or the like, mostly both the sliding member and the opposite member are made of aluminum. In this case, since the aluminum members slide with one another, the following surface-treatments are applied on the vanes which are a sliding member.

According to one surface treatment, an electroless Ni—P plating or electroless Ni—B plating, which exhibits good wear resistance, is applied on the surface of the vanes. According to another surface treatment, hard additives, a solid lubricant and the like are dispersed in the electroless Ni—P plating coating to enhance the sliding characteristics. Enhancement of wear resistance is also achieved by heating the electroless Ni—P plating coating to 300° C. or lower, and hence, hardening the coating.

The electroless Ni—P plating used for the surface treatment of the sliding member has usually P content of 6 to 10% and is, hence, of medium or high P type. The enhancement of sliding characteristics is attained by hardening, that is, increasing Hv 450–500 of hardness after the plating to extremely high hardness of from Hv 700–800 by means of heating to a temperature of 300° C. or lower. For example, according to Japanese Unexamined Patent Publication (kokai) No. 64-32087, the electroless Ni—P plating coating with 8 to 10% of P is formed on vanes, and its hardness is increased to approximately Hv 700–800 by heat treatment. However, since the temperature of heat treatment for obtaining the coating hardening to as much as Hv 700–800 is high, the material strength of the aluminum alloy is lowered. The temperature of heat treatment is, therefore, limited. Actually, the hardness of coating attained is only from approximately Hv 500–600.

According to Japanese Unexamined Patent Publication (kokai) No. 8-158,058, there is proposed a sliding member, which is an aluminum-alloy substrate and a Ni—P—B based electroless plating which contains P—from 0.5 to 3.0 wt % and B—from 0.05 to 2.0 wt % and is applied on the substrate. A feature of the electroless plating coating is that it is hardened to an extremely high hardness of Hv 800 or more by heat treatment at a temperature which does not lead to appreciable reduction in the hardness of the aluminum alloy.

In addition, the electroless Ni—B plating used for the surface treatment of the sliding member has from 0.3 to 0.8% by weight of B content. Although the hardness of electroless Ni—B plating coating is enhanced to approximately Hv 800 by heat treatment, blister defects on the plating coating are liable to be caused by the heat treatment. Abnormal wear of the plating coating may, therefore, occur under particularly severe testing conditions.

Heretofore, the medium or high P type Ni—P plating coating has been applied on the surface of a sliding member, since high hardness is attained by heat treatment. The expected level of wear resistance of the NiP plating coating used, however, is not attained. Particularly, abnormal wear of the high-P type electroless plating coating occurred when the Al—Si alloy of a rotor or housing, i.e., the opposite material of the vanes, had coarse primary Si crystals of 50 μm or more and/or numerous Si particle-number of more than 300/mm². In addition, when the load was increased to augment the surface pressure of vanes, the abnormal wear occurred.

In addition, the known Ni—P—B electroless plating coating has usually lower P content than that of the known Ni—P electroless plating coating. However, since the crystallinity of Ni—P—B electroless plating coating is considerably disordered, problems in the sliding characteristics are incurred. It turned out that these problems are attributable to even a small amount of B disordering the crystallinity of Ni.

It is, therefore, an object of the present invention to apply a Ni-based electroless plating coating having excellent sliding characteristics on an aluminum-based sliding member, and to provide an aluminum-based sliding member which can be used under a high load.

It is another object of the present invention to provide a surface treating method which can enhance the sliding characteristics of the low-P type electroless Ni—P—B plating coating.

SUMMARY OF INVENTION

The present inventors intensively undertook research to improve the sliding characteristics of a material, which consists of an aluminum alloy and the electroless Ni—P and Ni—P—B plating coating applied thereon. Unexpectedly, it was discovered that crystallinity disordering is negligible slight and high hardness is obtained at a low heat-treating temperature, when the electroless plating coating is a low-P type electroless plating with a small addition of B.

The sliding member of the present invention completed by the above discovery resides in that the material consists of an aluminum alloy and, further, an electroless Ni—P—B plating coating containing from 0.05 to 5% by weight of P and from 0.01 to 0.05% by weight of B is formed on the sliding surface of the material.

The first method for surface treating of the sliding member according to the present invention resides in that the barrel polishing treatment is applied on an electroless Ni—P—B plating coating containing from 0.05 to 5% by weight of P and from 0.01 to 0.05% by weight of B and formed on the sliding surface of the material of a sliding member which consists of an aluminum alloy.

The second method for surface treating of the sliding member according to the present invention resides in that the shot-blasting treatment is applied on an electroless Ni—P—B plating coating containing from 0.05 to 5% by weight of P and from 0.01 to 0.05% by weight of B and formed on the sliding surface of the material of a sliding member which consists of an aluminum alloy.

The third method for surface treating of the sliding member according to the present invention resides in that laser beam is irradiated on an electroless Ni—P—B plating coating containing from 0.05 to 5% by weight of P and from 0.01 to 0.05% by weight of B and formed on the sliding surface of the material of a sliding member which consists of an aluminum alloy.

The fourth method for surface treating of the sliding member according to the present invention resides in that high-frequency induction heat-treatment is applied on an electroless Ni—P—B plating coating containing from 0.05 to 5% by weight of P and from 0.01 to 0.05% by weight of B and formed on the sliding surface of the material of a sliding member which consists of an aluminum alloy.

The Ni—P—B plating coating mentioned above may further contain from 0.1 to 1.0% by weight of Co and/or from 0.05 to 1.0% by weight of W which are incorporated in the Ni crystals and hence enhance the hardness of the coating.

BEST MODE FOR CARRYING OUT THE INVENTION

Figure 1:
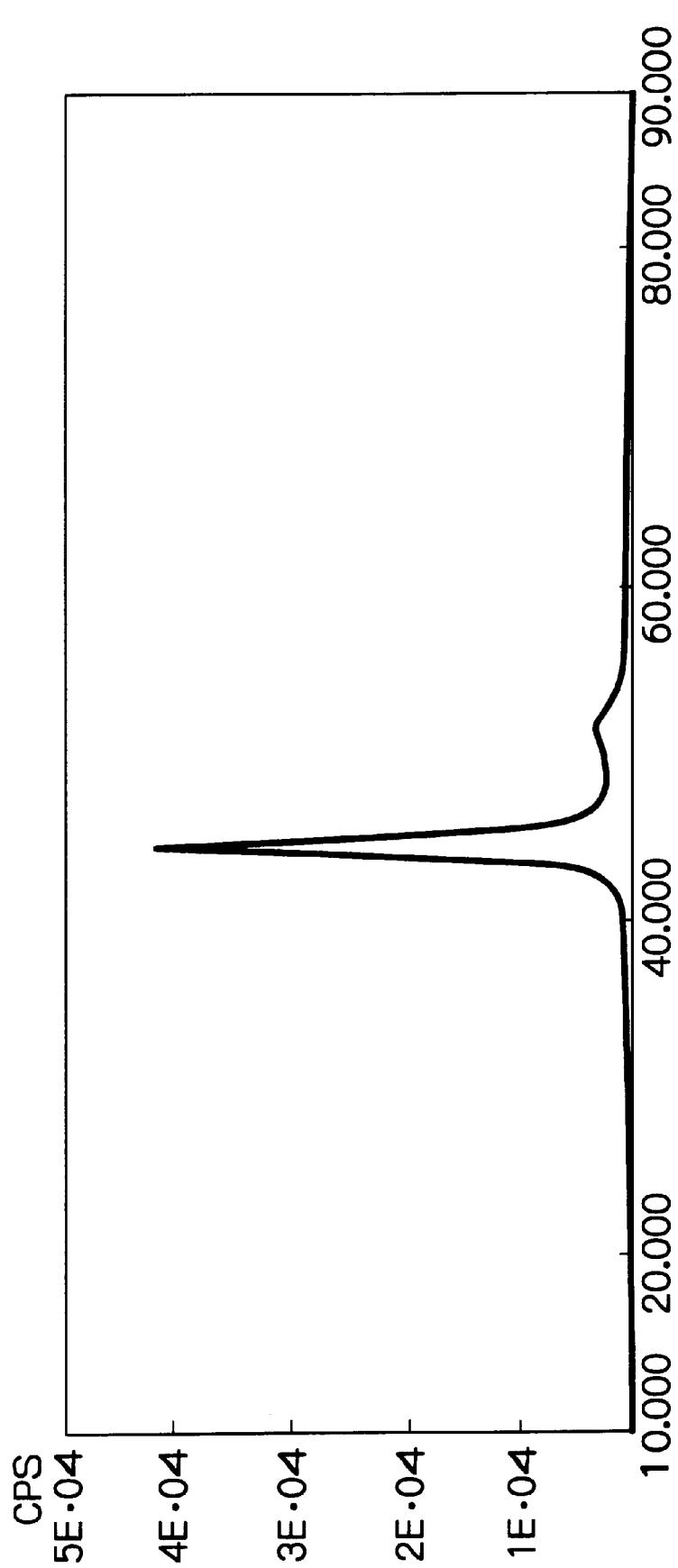
FIG. 1 is an X-ray diffraction chart of the Ni—P—B plating coating lying within the inventive composition range.

The low-P type electroless Ni—P—B plating coating having from 0.05 to 5% by weight of the P content according to the present invention has low P content such that the Ni crystal lattices of the plating coating is of low strain, and hence the plating coating is of excellent crystallinity. The B content: lies within the range of from 0.01 to 0.05% by weight, because the compatibility is unsatisfactory at a B content of less than 0.01% by weight and, further, the plating coating is liable to non-uniformly deform against external force, so that cracks and fatigue may result when the B content is more than 0.05% by weight.

Hardness, and hence wear resistance, of the electroless Ni plating coating, in which P and B are added within the above-mentioned ranges, are enhanced by means of heat treatment.

In addition, when the P content lies within the above-mentioned range, such phenomena as peeling, cracking or reduction in fatigue strength, which may occur due to the tensional inner stress, on the electroless plating coating, do not appear (the tensional internal stress is 1–5 kg/mm$^2$ in the case of 10–30 μm thick Ni—P plating coating). In addition, since B added in a trace amount within the above mentioned range generates compressional stress is (0.1–1.5 kg/mm$^2$ in the case of 10–30 μm thick Ni—B film) B mitigates the tensional stress of the electroless Ni—P plating coating, thereby making it difficult for the cracks and fatigue to generate due to the tensional stress.

When the barrel polishing treatment, shot-blasting treatment, laser-beam treatment and high-frequency heat treatment are applied to the above mentioned electroless Ni—P—B plating film, the deformation uniformly takes place without great strain of crystals and melting uniformly take place, so that surface conditions obtained are such that a crystal structure is preferable as a sliding characteristic and coating hardness is high. Specifically, although crystal grains are recognized on the coating surface after the plating, the crystal grains diminish in the vicinity of the surface and a more smooth and hard state is realized, while the surface is squeezed by means of, for example, barrel polishing and shot blasting. When the P content of electroless Ni—P—B plating coating is less than 0.05%, the plating per se becomes difficult and the sliding characteristics are poor in view of the seizure resistance. On the other hand, when the P content exceeds 5% by weight, the structure is liable to become a complex Ni—P—B compound of amorphous structure. Since there is a number of such sites as the precipitation interfaces of the Ni—P—B compounds and grain boundaries, which are easily deformable, in the structure, non-uniform deformation is liable to occur, when external force is imparted. Since there is a large difference between the liquidus and solidus of the melt, the post-solidification segregation becomes great when a high-density energy beam is applied by laser beam. Furthermore, the melt so vigorously flows that the crystal strains are increased. A preferable P content is from 1.5 to 2.5% by weight. A preferable B content is from 0.01 to 0.04% by weight.

Thickness of the electroless Ni—P—B plating coating is generally from 5 to 40 μm, more preferably from 10 to 20μm.

The features of the present invention are described more in detail with reference to the drawings.

Figure 2:
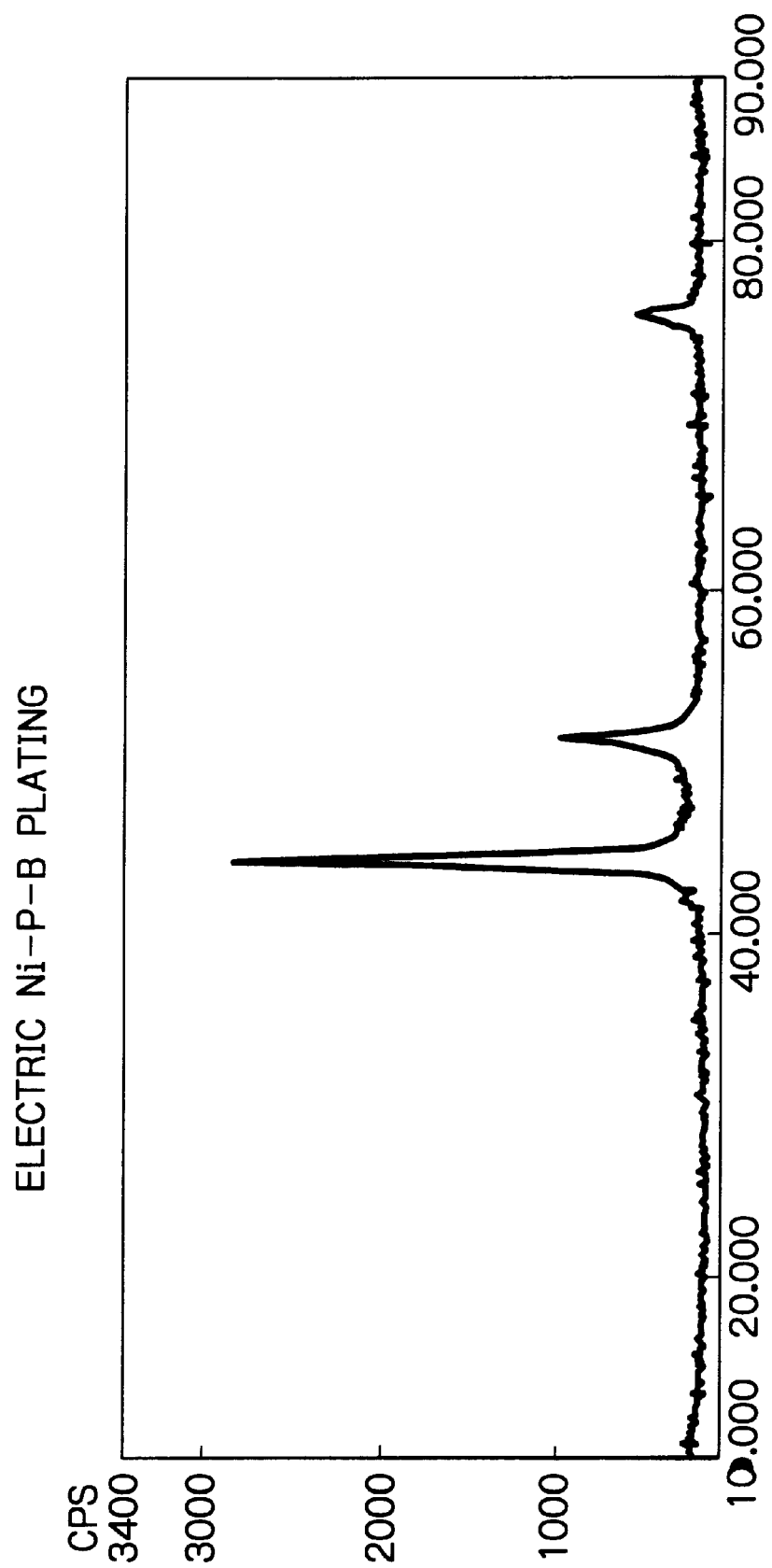
FIG. 2 is an X-ray diffraction chart of the Ni—P—B plating coating having P and B amounts larger than the inventive composition range.

FIG. 1 shows an X-ray diffraction chart of the electroless Ni—P—B plating coating (a) which contains 2.0% by weight of P and 0.02% by weight of B. FIG. 2 shows an X-ray diffraction chart of the electroless Ni—P—B plating film (b) which contains 8% by weight of P and 3% by weight of B. In these drawings, lo the coating (a) of FIG. 1 has the P and B contents lying within the inventive ranges, while the coating (b) of FIG. 2 has these contents outside the inventive ranges. It is understood by comparing these drawings that the former has sharper (ill) peaks than the latter.

The aluminum alloys, on which the above mentioned two kinds of electroless Ni—P—B plating coating were applied, were subjected to a reciprocating sliding test under the condition of 1470N of load and 0.12 m/s of speed for 5 hours. The specific wear amount (10$^{-9}$ mm$^2$/kg) was as follows.

Coating (a): 0.5

Coating (b): 5.0

In order to further investigate how the P and B contents of the electroless Ni—P—B plating coating exert influence upon the sliding characteristics, the former coating (a) was heat treated at 200° C. for 3 hours so as to attain the same post-plating hardness of the latter film (b), i.e., $Hv_{0.1}$=850. The samples having these two kinds of film were subjected to a flat-disc rotary wear test under the condition of 9.8N. The wear amounts (mg/1000 rotations) were as follows.

Coating (a): 0.2

Coating (b): 0.8

It is understood from the above results that: the orientation of the electroless Ni—P—B plating coating is enhanced by lowering the P and B amounts; and, the wear resistance is enhanced corresponding to the enhancement of orientation. Contrary to this, the electroless Ni—P—B plating coating (b) has higher P and B contents and the same hardness as coating (a) and is of lower orientation than the coating (a). The orientation of the coating (b) is different from that of the (111) crystal. As a result, the surface area of the grain boundaries is large, and, further, the proportion of crystals, in which the lattice mis-matching occurs, is increased. This seems to be a reason for the wear to be liable to occur.

The barrel polishing employed in the first method according to the present invention is a treatment, in which the vanes, a polyester-based material as the polishing media, barreled material and water are admitted in a rotary vessel and rotated or vibrated, thereby smoothening and hardening the surface of the plating coating. A preferably employed polishing condition is 240 rpm of rotation and 5 minutes of time.

The low P—low B electroless Ni plating coating was barrel polished and the post-barrel polished structure was observed by a scanning electron microscope. The structure of post-barrel-polished low P—low B electroless Ni plating coating exhibited completely different uniformity from that of the high P electroless Ni plating coating without addition of B.

The shot-blasting employed in the second method of the present invention is a treatment in which such particles as steel are impinged on the electroless plating surface at high speed to generate compressional stress on the surface. A more preferable condition is such that the temperature of the electroless Ni—P—B plating coating is elevated to the recrystallization temperature or higher and, further, somewhat plastic deformation is created on the surface of the plating coating; hence, fine and different crystal morphology from that obtained directly after plating is generated.

Since the highly oriented plating structure is considerably reflected in the orientation of recrystallized structure, the density of the structure is furthermore enhanced due to the orientation and refinement. Specifically, the shot particles used are hard beads, such as steel or $Al_2O_3$, having Hv 600 or more of hardness, or carbon or the like. The particle size is in a range of from 0.03 to 0.4 μm. The projecting speed is 80 m/sec or more.

Figure 3:
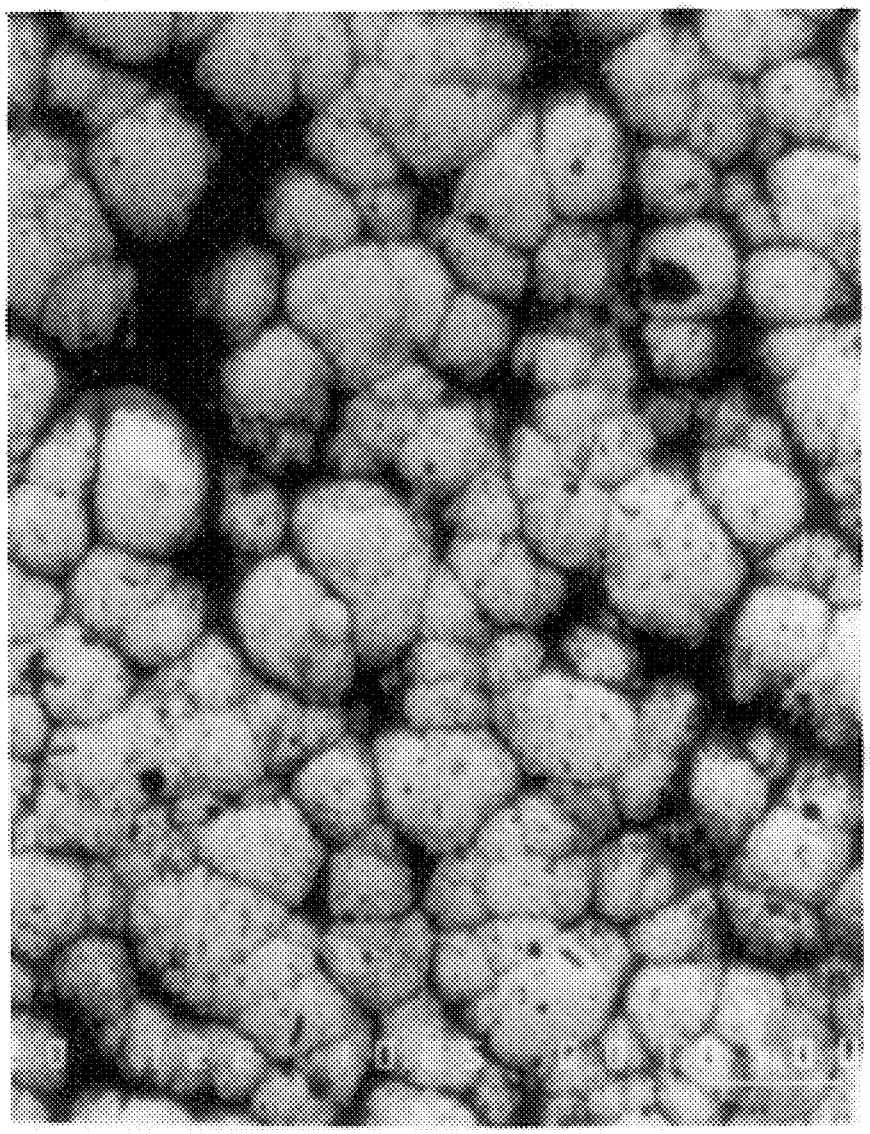
FIG. 3 is a photograph (magnification 1000 times) of the observation of the structure of a low-P and -B electroless plating coating by means of an electron microscope.
Figure 4:
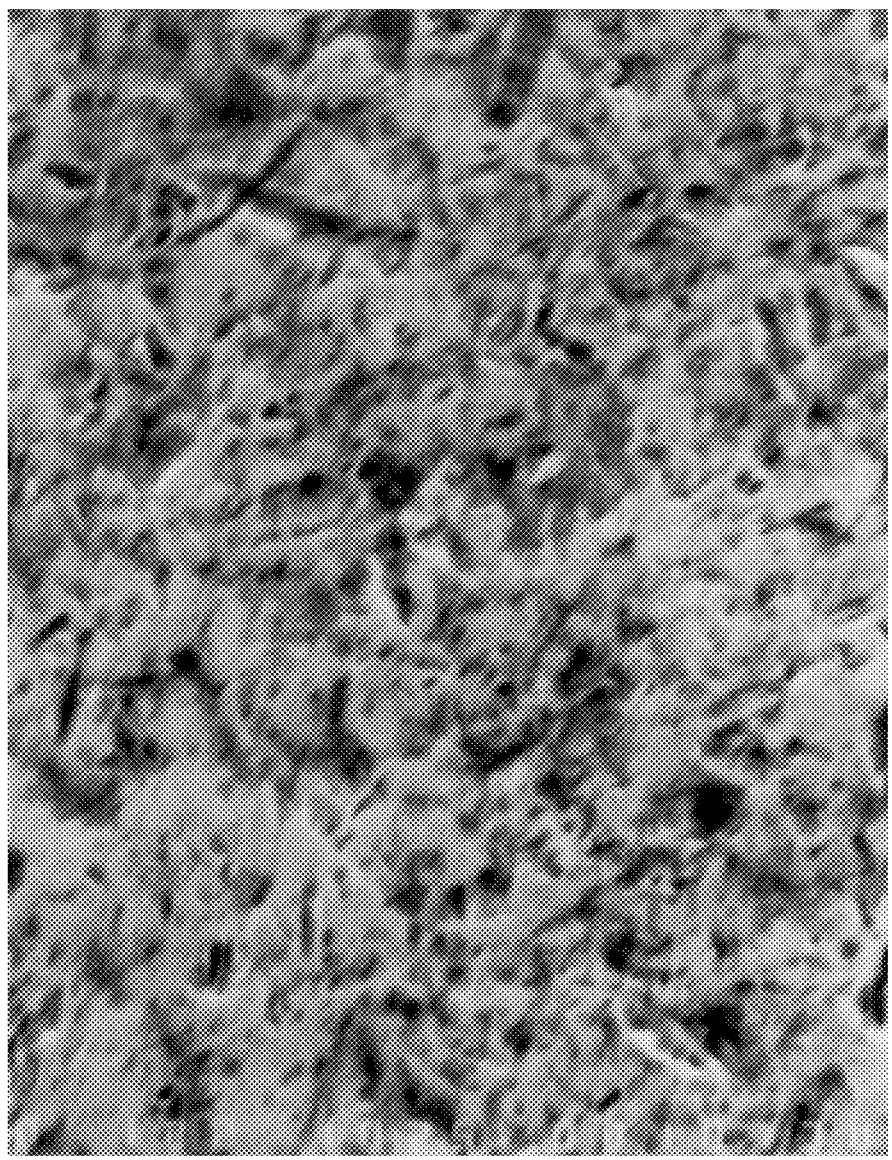
FIG. 4 is a photograph (magnification 1000 times) of the observation of the structure of a post-shot blasted low-P and -B electroless plating coating by means of an electron microscope.
Figure 5:
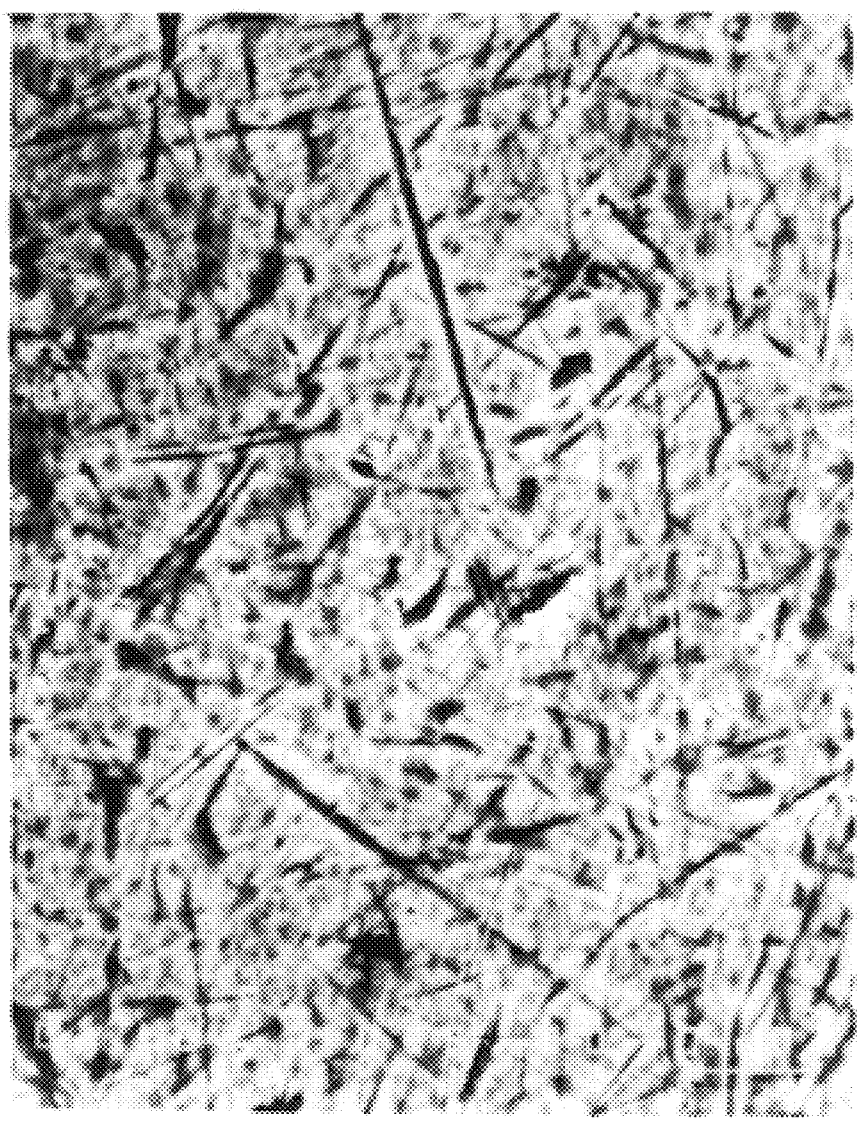
FIG. 5 is a photograph (magnification 1000 times) of the observation of the structure of a post-barrel polished low-P and -B electroless plating coating by means of an electron microscope.
Figure 6:
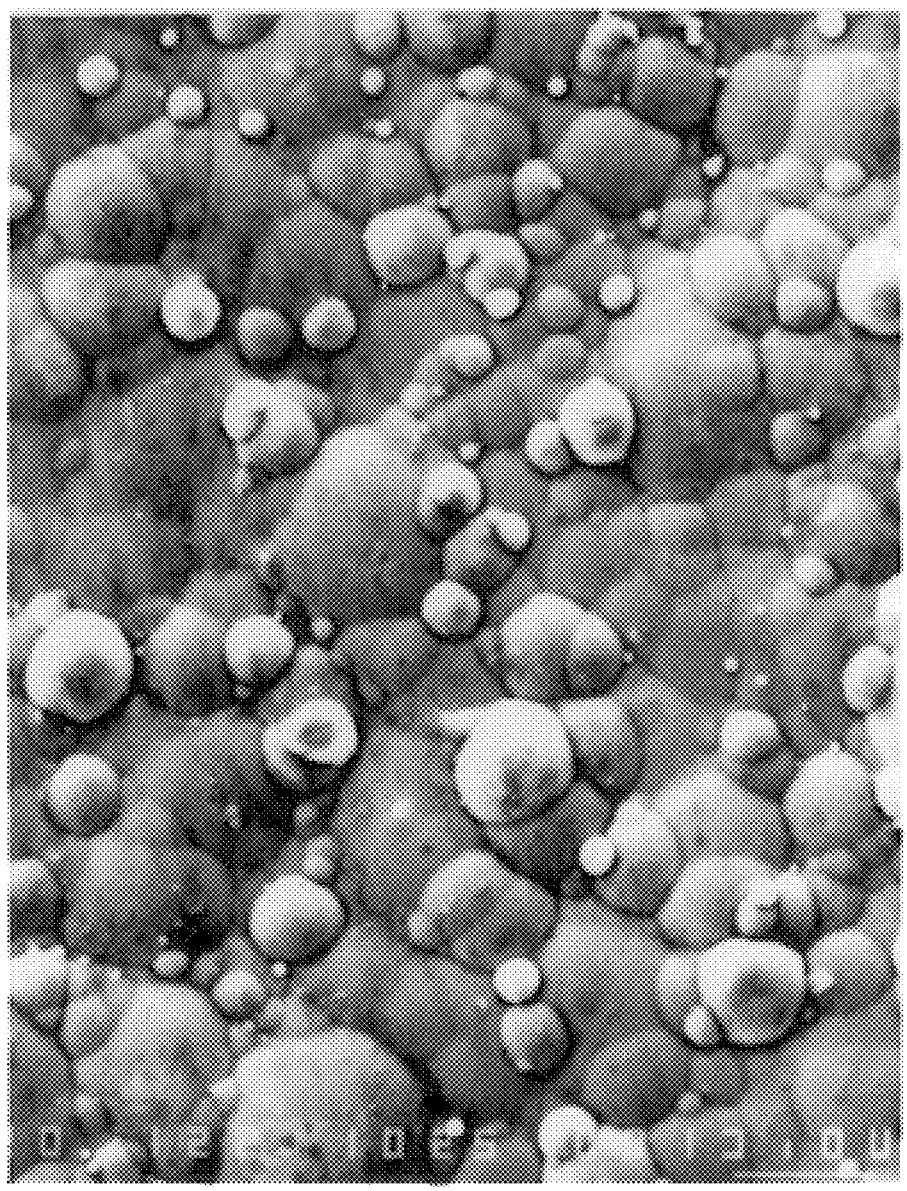
FIG. 6 is a photograph (magnification 1000 times) of the high-P and -B electroless plating coating.

In FIG. 3 is shown a photograph (magnification 1000 times) of observation of the low P—low B electroless plating coating. In FIG. 6 is shown the photograph (magnification 1000 times) of observation of the high P—B electroless plating coating. It is understood from the comparison of these drawings that the structure of low P—low B electroless plating coating became fine and dense. In addition, in FIG. 4 is shown a photograph (magnification 1000 times) of observation of the post shot-blasting, while in FIG. 5 is shown a photograph (magnification 1000 times) of observation of the post barrel-polishing. It is understood that these treatments furthermore refine and densify the structure.

The laser irradiation employed in the third method of the present invention is a treatment in which the electroless Ni—P—B plating coating is instantaneously and locally melted; as a result, the heat of melt is withdrawn by the surrounding Ni—P—B and substrate and the melt solidifies. In this case, since the melting occurs locally, the heat absorption withdrawal amount from the melt is very large so that the solidification occurs at a high rate. As a result, P and B are forcibly dissolved in the Ni crystals to harden them and refine the crystal grains. The kind of laser is not limited. YAG pulse laser having from approximately 100 to 400 W/cm$^2$ (beam area) of output can be preferably used.

An appropriate jig is used in the operation of laser irradiation to relatively displace a laser gun and a sliding member in such a manner that spots are successively irradiated on the sliding portions of the latter.

Next is shown an example that an electroless Ni—P—B plating coating is hardened by laser irradiation. The laser irradiation condition was as follows.

Kind of laser: YAG pulse

Output of laser: 100–400 W/cm$^2$

Diameter of laser beam: 2 cm

Scanning speed of laser: 10 cm/sec

Electroless Ni—P—B plating coating: 20 μm of thickness

It is understood from Table 1 that extensive hardening occurs in a range of P=1.5–3.6% and B=0.02–0.03%.

TABLE 1

| | | Hardness of plating coating (Hv) | |
|---|---|---|---|
| P Content (wt %) | B Content (wt %) | Before laser irradiation | After laser irradiation |
| 1.5 | 0.02 | 660 | 850 |
| 2.2 | 0.02 | 650 | 810 |
| 3.6 | 0.03 | 610 | 745 |
| 6.2 | 0.05 | 570 | 640 |
| 2.5 | 0.05 | 540 | 615 |

The high-frequency heat-treatment employed in the fourth method of the present invention is to carry out the above-mentioned forced solution of P and B by means of the high-frequency induction heating. It is necessary in the high-frequency heating that the temperature of the aluminum-alloy material is maintained at preferably 200° C. or lower and, further, the temperature of the plating coating does not exceed the Curie point of Ni (631K), so as not to concentrate the eddy current in the plating coating but let the eddy current flow as much as possible in the materials. Frequency of the high frequency is preferably 70 kHz or more.

Next is shown an example that an electroless Ni—P—B plating coating is hardened by high-frequency heat treatment. The condition of high frequency heat treatment is as follows. It is understood from Table 2 that extensive hardening occurs in a range of P=1.5–3.6% and B=0.02–0.03%.

Frequency: 100 kHz

Output of high frequency: 80 kW

Electroless Ni—P plating coating: 0.02 mm of thickness

TABLE 2

| P Content (wt %) | B Content (wt %) | Hardness of plating coating (Hv) | |
|---|---|---|---|
| | | Before high-frequency heat treatment | After high-frequency heat treatment |
| 1.5 | 0.02 | 660 | 865 |
| 2.2 | 0.02 | 650 | 820 |
| 3.6 | 0.03 | 610 | 750 |
| 6.2 | 0.05 | 570 | 640 |
| 2.5 | 0.05 | 540 | 615 |

In order that the low P—low B added electroless Ni plating coating, to which the above-mentioned first through fourth treatments are applied, can have enhanced adhesivity with the substrate material, medium or high P electroless Ni—P plating coating may be applied as the underlying coating.

However, orientation of the high P-type electroless Ni—P plating coating is low and the relative (111) intensity is approximately 60% at the highest. The orientation of the low P—low B type electroless Ni plating coating, which is formed in contact with the underlying coating, is slightly lowered under the influence of the latter. The medium-or high-P coating is, therefore, used as the underlying coating of the low-P/low-B type electroless Ni plating coating in a case where the orientation may be sacrified but the adhesivity should be improved.

The P content of the high P electroless Ni—P plating coating is preferably from 0.5 to 15% by weight, more preferably from 5 to 8% by weight. From 0.1 to 1.0% by weight of Co may be added.

The low-P and low-B type electroless Ni plating coating, to which the inventive first through fourth treatment methods are applied, can also be heat-treated to surface-harden and hence to enhance the wear resistance.

Figure 7:
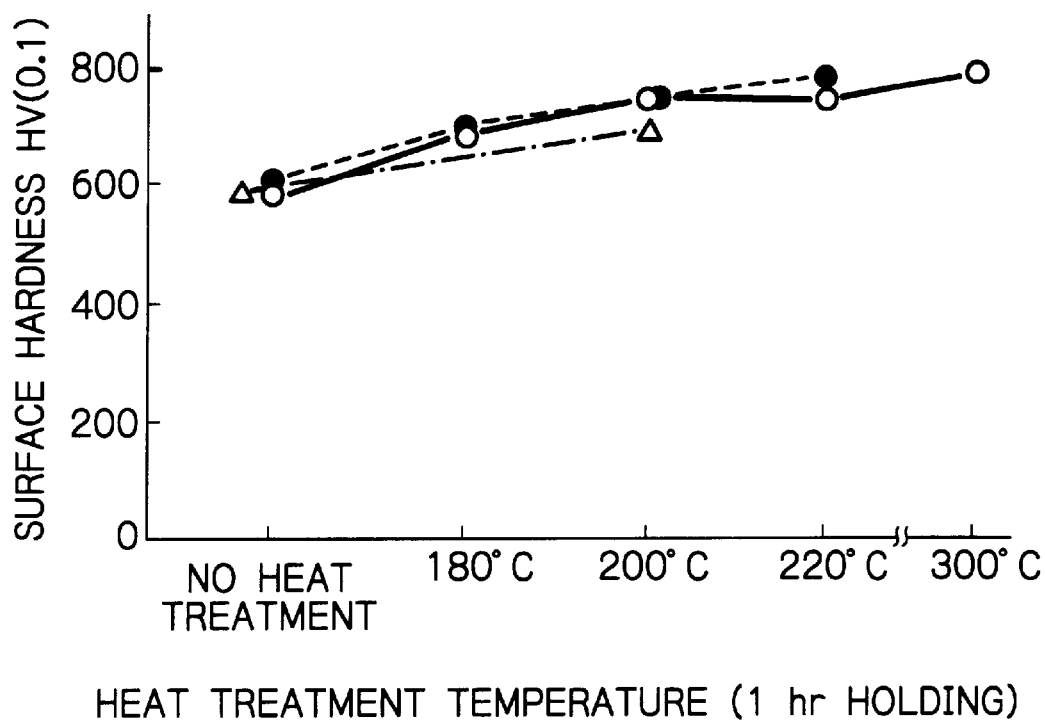
FIG. 7 is a graph showing the relationship between the surface hardness of the electroless plating coating with 2% by weight of P content and 0.02% by weight of B and the heat-treating temperature.

FIG. 7 is a graph showing the relationship between the heat treating temperature (1 hour holding) and surface hardness of an electroless Ni—P—B plating coating which contains 2.8% by weight of P and 0.02% by weight of B.

Figure 8:
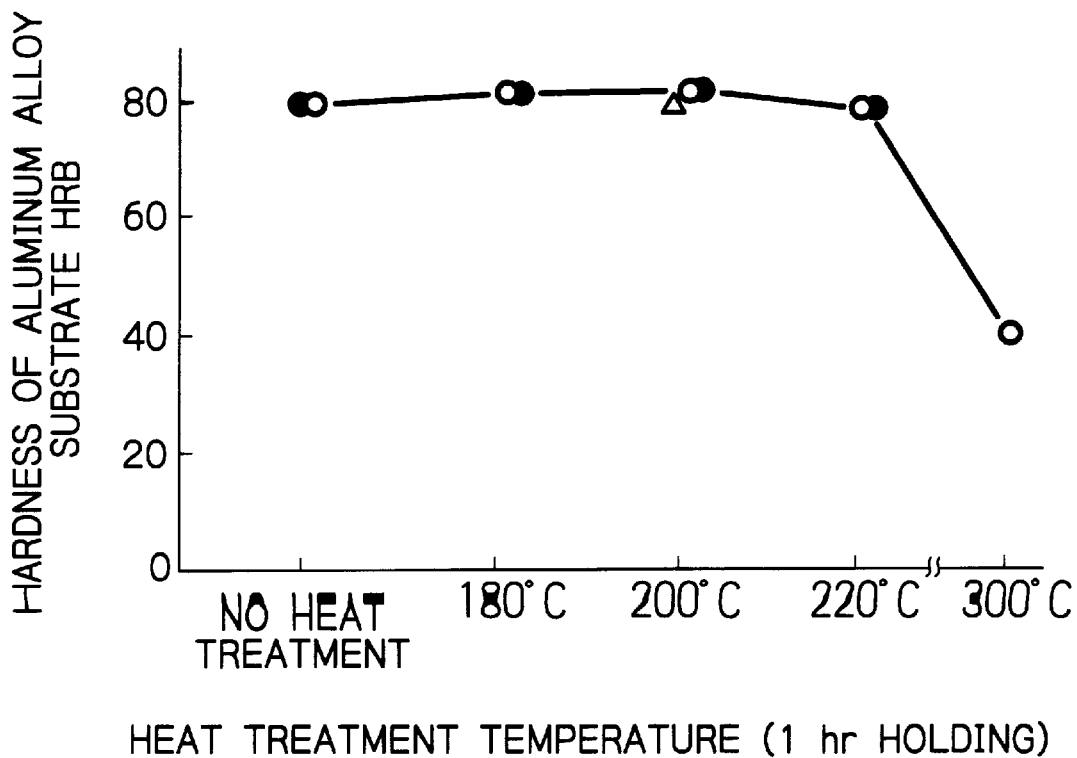
FIG. 8 is a graph showing the relationship between the hardness of aluminumalloy substrate and the heat-treating temperature.

FIG. 8 is a graph showing the relationship between the hardness of the aluminum alloy substrate and the heat-treating temperature. Here, the surface hardness was obtained by using a Vickers hardness tester (0.1 kg of load), and hardness was obtained by using a Rockwell B harness tester. The hardness was obtained by measuring the surface hardness of the respective samples. That is, the fact that the indentation depth is different depending upon the measuring load, is utilized to differentiate the measuring depth. In addition, the symbols Δ, ⊙, ● in FIGS. 7 and 8 indicate three samples. It is understood from these drawings that, although the surface hardness is slightly increased by heat treatment, the hardness of the aluminum-alloy substrate virtually does not change at the heat-treating temperature of 220° C. or lower.

Figure 9:
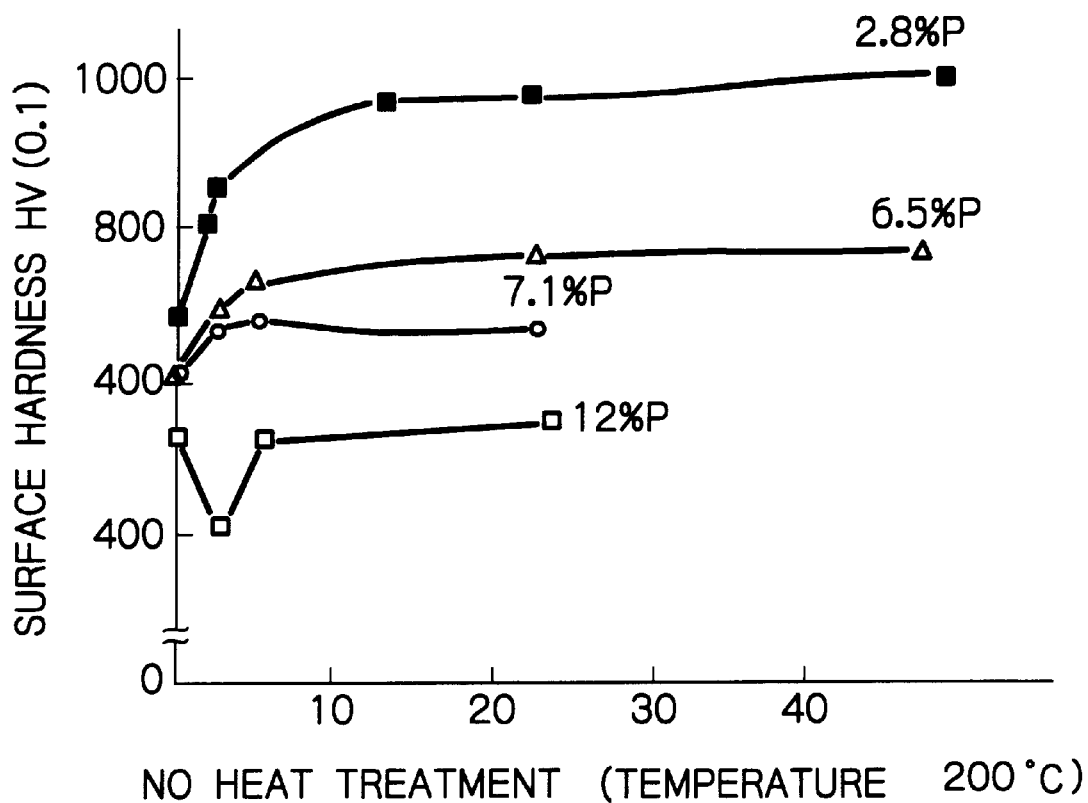
FIG. 9 is a graph showing the relationship between the surface hardness of the electroless plating coating with 2.8% by weight of P content and 0.02% by weight of B and the heat treating temperature.

FIG. 9 is a graph showing the relationship between the P and B contents and the surface hardness of electroless Ni—P—B plating coating which contains 2.8 to 12% by weight of P and 0.02% by weight of B, and the heat-treating time at 200° C. It is understood from this drawing that, when the P content of the electroless Ni—P—B plating coating is as low as 2.8% by weight, its surface hardness is elevated to approximately Hv 1000 at prolonged holding of 20 hours or longer.

Various aluminum-alloy wrought materials and casting materials can be used as the aluminum alloy. It is also possible to use the Al—Si eutectic powder, to which a large amount of heavy metals such as Fe, Ni, Mo and the like is added, and which is shaped by the powder-metallurgical method. Such powder-metallugically shaped material is sold under the trade name of SHORIK (Showa Denko K.K.) and Sumialtaco (Sumitomo Electric Co., Ltd.)

Most kinds of aluminum-alloy wrought materials undergo over-aging by heat treatment at 200° C. for 20 hours or longer. Among the 2000 series, the appropriate aging time of 2218 alloy is long. The 2218 alloy should, therefore, be selected as the material. Incidentally, when the heat-treating time is shorter than 10 hours, most of the heat-treatable aluminum alloys including high-strength aluminum alloys such as 2214 do not undergo over-aging.

Preferably, the pre-treatments, examples of which are shown below, are successively carried out to enhance the adhesivity of electroless Ni—P—B plating coating on the aluminum-alloy material.

Alkali degreasing (50° C.×5 minutes with the use of alkaline degreasing agent)

Alkali etching (50° C.×40 seconds, NaOH bath)

Removal of smut (27° C.×40 seconds, detergent bath mainly composed of nitric acid)

Zinc-replacing plating treatment (1) (27° C.×25 seconds, zincate bath)

Peeling of zinc (270° C.×60 seconds, 50% nitric acid) Zinc-replacing plating treatment (2) (27° C.×25 seconds, zincate bath)

After the surface treatments, such as shot blasting, barrel treatment, laser-beam irradiation and the like, the as-treated surface may be used as the sliding surface. In the case of high-frequency heat treatment, the polishing treatment and the like may be carried out.

The materials as treated above can be used as vanes of a rotary compressor, radial plane bearings, thrust plane bearings and the like.

The aluminum-alloy materials treated by the methods of the present invention were tested under conditions which reproduced a load high and local contact. Result of the test is next described.

EXAMPLE 1

Figure 10:
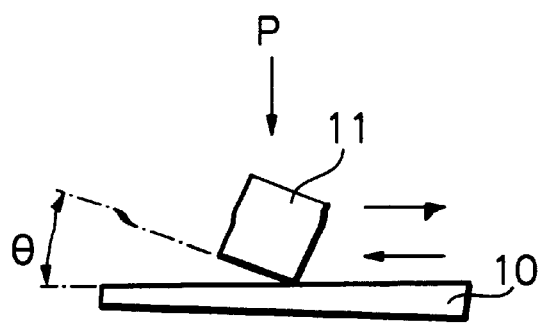
FIG. 10 is a drawing for illustrating the wear test.

FIG. 10 is a schematic drawing for illustrating the test method in the present examples. In the drawing, 10 is an aluminum alloy material (AHS-3-$T_7$) treated by the inventive methods and the comparative methods, and 11 is a block (A 390 aluminum-alloy, and the average particle diameter of 30 $\mu$m of primary Si crystals). The material 10 is 35×14×3 mm in size.

Also, in FIG. 10, the angle θ=1°, the load P was 150 kgf (15.3N), the testing time was 5 hours, the reciprocating sliding frequency was 10 Hz, the stroke was 6 mm, and the oil feeding was 30 mL/h.

The materials (P of Table 3) were not subjected to the above described pre-surface treatments or subjected to the pre-surface treatments, followed by forming on the entire surface a 15 $\mu$m thick electroless plating coating which had 2.8% by weight of P content and 0.02% by weight of B content. The ingredients of the plating liquor were nickel sulfate, hypophosphorous acid, sodium hydroxide, cobalt sulfate and the like. The pH and temperature of the plating liquor were 6.5 and 80° C., respectively. The post-plating surface hardness was Hv 710.

The surface treatments used for the test were as follows.
1. Barrel polishing treatment
    Kind of polishing media: polyester resin+zirkon
    Amount of polishing media: 1.5 kg
    Amount of liquid: 1.0 kg (water)
    Number of materials: 20
    Volume of rotary vessel: 0.01 m$^3$
    Rotation number of rotary vessel: 200 rpm
    Treating time: 5 minutes
2. Shot blasting treatment
    Material of shot grains: $Al_2O_3$, hardness Hv 1000
    Diameter of shot grains: 200 μm in average
    Projecting speed of shots: 150 m/second
    Projecting amount: 50 kg/m$^2$/sec
3. Laser irradiating treatment
    Kind of laser: YAG pulse (product of Toshiba)
    Output of laser: 10 kW
    Output per beam diameter: 100–400 w/m$^2$
4. Heat treatment
    Heat treatment was carried out at 200° C. for 60 minutes.
    Treatment 1 was then carried out.
5. Heat treatment
    Heat treatment was carried out at 200° C. for 60 minutes.
    Treatment 2 was then carried out.
6. Heat treatment
    Heat treatment was carried out at 200° C. for 60 minutes.
    Treatment 3 was then carried out.

A 15 μm-thick electroless Ni—P—B plating coating, the composition of which was 0.5% by weight of Co and 0.1% by weight of W being added to the above-described electroless Ni—P—B plating coating, was formed on the 2 μm thick intermediate plating coating. This coating was plated by using plating liquid produced by Okuno Seiyaku Industries (trade name—TOPNICKORON TOM) having 6% by weight of P content. The following surface treatments were then carried out.

7: Treatment 1
8: Treatment 2
9: Treatment 3
10: Treatment 4
11: Treatment 5
12: Treatment 6

The following treatments were also carried out as the comparative examples.
(a) the above-described low P, B electroless plating
(b) the high-P, -B electroless plating (P content=8% by weight, and B content=1.2% by weight)
(c) The above described post heat-treatment (b)
The results are shown in Table 3.

TABLE 3

| Treatment method | Post treating surface hardness (Hv) | Specific wear amount of test specimens (10$^{-9}$ mm$^2$kg$^{-1}$) | Specific wear amount of block (10$^{-9}$ mm$^2$kg$^{-1}$) | Remarks |
| --- | --- | --- | --- | --- |
| P | 710 | 4.5 | 1.0 | Invention only plating |
| 1 | 750 | 4.3 | 1.0 | Invention |
| 2 | 780 | 4.1 | 1.0 | Invention |
| 3 | 790 | 3.6 | 1.0 | Invention |
| 4 | 820 | 3.3 | 0.9 | Invention |
| 5 | 850 | 3.1 | 0.9 | Invention |
| 6 | 810 | 3.8 | 1.0 | Invention |
| 7 | 755 | 3.5 | 0.8 | Invention |
| 8 | 800 | 3.2 | 0.7 | Invention |
| 9 | 810 | 3.2 | 0.8 | Invention |
| 10 | 850 | 2.9 | 0.7 | Invention |
| 11 | 870 | 2.6 | 0.6 | Invention |
| 12 | 830 | 2.9 | 0.8 | Invention |
| a | 670 | 5.8 | 1.2 | Comparative |
| b | 637 | 12.0 | 3.5 | Comparative |
| c | 599 | 9.0 | 2.0 | Comparative |

As is shown in Table 3, the wear of the specimens and the block are smaller in the present case than that of the comparative examples.

EXAMPLE 2

Instead of A390 used as the block 11 in Example 1 was used extruded material of Al—17% Si—5% Fe—4% Cu—1.2% Mg 0.5% Mn ($T_6$ treatment: $HR_B$ 94). The treatments 1 through 12 were carried out. The results obtained were that the numerical values were virtually not different from those in Table 1.

EXAMPLE 3

The materials treated in Examples 1 and 2 (Treatment 1) were mounted in an actual compressor as vanes, and the wear test was carried out under the following conditions.
    Testing machine: rotary type compressor (actual machine was used as a tester)
    Rotation number: 800 rpm
    Exhausting power/Suction pressure(kg/cm$^2$): 28/4.0
    Exhausting temperature/Suction temperature (°C.): 127/24
    Time: 100 hours As a result of the test, the wear amount of the vanes were 1–2 μm and very slight.

Industrial Applicability

As is described hereinabove, since the low-P type electroless Ni—P—B plating coating provided by the present invention is superior in sliding property to the conventional coating of the same kind, the former coating can enhance the sliding performance of the sliding parts, which are liable to be in one-sided contact and are used under high local load. The reliability of various machines and apparatuses such as a compressor can, therefore, be enhanced.

What is claimed is:

1. A sliding member comprising:
    an aluminum alloy having a sliding surface; and
    an electroless Ni—P—B plating coating containing from 0.05 to 5% by weight of P and from 0.01 to less than 0.05% by weight of B and formed on the sliding surface of the aluminum alloy.

2. A sliding member according to claim 1, wherein said Ni—P—B plating coating contains from 1.5 to 3.6% by weight of P and from 0.02 to 0.03% by weight of B.

3. A sliding member according to claim wherein said Ni—P—B plating coating contains at least one element selected from the group consisting of 0.1 to 1.0% by weight of Co and from 0.05 to 1.0% by weight of W.

4. A sliding member according to claim 2 or 3, wherein said Ni—P—B plating coating has a hardness of from approximately Hv 700 to approximately Hv 1000.

5. A sliding member according to claim 1 or 2, further comprising an underlying electroless N—P plating coating having from more than 5% by weight to 15% or less by weight of the P content, applied beneath the electroless Ni—P—B plating coating.

6. A sliding member according to claim 5, wherein said Ni—P—B plating coating contains at least one element selected from 0.01 to 1.0% by weight of Co and from 0.05 to 1.0% by weight of W.

7. A sliding member according to claim 5, wherein said Ni—P—B plating coating has a hardness of from approximately Hv 700 to approximately Hv 1000.

8. A sliding member according to claim 7, wherein said Ni—P—B plating coating contains at least one element selected from 0.1 to 1.0% by weight of Co and from 0.05 to 1.0% by weight of W.

9. A surface treatment method of a sliding member comprising the steps of:
applying on an aluminum alloy an electroless Ni—P—B plating coating containing from 0.05 to 5% by weight of P and from 0.01 to less than 0.05% by weight of B; and
subjecting said electro less Ni—P—B plating coating to a barrel polishing treatment.

10. A surface treatment method according to claim wherein said aluminum alloy contains at least one element selected from the group consisting of from 0.1 to 1.0% by weight of Co and from 0.05 to 1.0% by weight of W.

11. A surface treatment method according to claim 9 or 10, further comprising a step of heat treating said electroless Ni—P—B plating coating at a temperature of from 100 to 200° C.

12. A surface treatment method according to claim 9, further comprising a step of applying on said aluminum alloy an underlying electroless Ni—P plating coating having from more than 5% by weight to 15% by weight or less of the P content.

13. A surface treatment method of a sliding member comprising the steps of:
applying on an aluminum alloy an electroless Ni—P—B plating coating containing from 0.05 to 5% by weight of P and from 0.01 to less than 0.05% by weight of B; and
subjecting said electroless Ni—P—B plating coating to a shot blasting treatment.

14. A surface treatment method according to claim 13, wherein said aluminum alloy contains at least one element selected from the group consisting of from 0.1 to 1.0% by weight of Co and from 0.05 to 1.0% by weight of W.

15. A surface treatment method of a sliding member according to claim 13, wherein said shot blasting treatment is carried out by projecting grains which have approximately the same hardness as or higher hardness than that of said electroless Ni—P—B plating coating, at a speed of 80 m/sec or more.

16. A surface treatment method according to claim 13, further comprising a step of applying on said aluminum alloy an underlying electroless Ni—P plating coating having from more than 5% by weight to 15% by weight or less of the P content.

17. A surface treatment method according to claim 13, 14, 15 or 16, further comprising a step of heat treating said electroless Ni—P—B plating coating at a temperature of from 100 to 200° C.

18. A surface treatment method according to claim 17, wherein the heat treatment is carried out before the shot blasting treatment.

19. A sliding member according to claim 17, wherein said Ni—P—B plating coating contains from 1.5 to 3.6% by weight of P and from 0.02 to 0.03% by weight of B.

20. A surface treatment method of a sliding member comprising the steps of:
applying on an aluminum alloy an electroless Ni—P—B plating coating containing from 0.05 to 5% by weight of P and from 0.01 to less than 0.05% by weight of B; and
subjecting said electroless Ni—P—B plating coating to a laser-beam irradiation.

21. A surface treatment method according to claim 20, wherein said aluminum alloy contains at least one element selected from the group consisting of from 0.1 to 1.0% by weight of Co and from 0.05 to 1.0% by weight of W.

22. A surface treatment method according to claim 20 or 21 further comprising a step of heat treating said electroless Ni—P—B plating coating at a temperature of from 100 to 200° C.

23. A surface treatment method according to claim 22 wherein said Ni—P—B plating coating contains from 1.5 to 3.6% by weight of P and from 0.02 to 0.03% by weight of B.

24. A surface treatment method of a sliding member comprising the steps of:
applying on an aluminum alloy an electroless Ni—P—B plating coating containing from 0.05 to 5% by weight of P and from 0.01 to less than 0.05% by weight of B; and
applying high-frequency heat treatment to said electroless Ni—P—B plating coating.

25. A surface treatment method according to claim 24, wherein said aluminum alloy contains at least one element selected from the group consisting of from 0.1 to 1.0% by weight of Co and from 0.05 to 1.0% by weight of W.

26. A surface treatment method according to claim 24 or 25, further comprising a step of applying on said aluminum alloy an underlying electroless Ni—P plating coating having from more than 5% by weight to 15% by weight or less of the P content.

27. A surface treatment method according to claim 26, further comprising a step of heat treating said electroless Ni—P—B plating coating at a temperature of from 100 to 200° C.

28. A vane of a rotary compressor comprising:
an aluminum-alloy substrate having a sliding surface; and
a barrel-polished electroless Ni—P—B plating coating containing from 0.05 to 5% by weight of P and from 0.01 to less than 0.05% by weight of B and formed on the sliding surface of the aluminum-alloy.

29. A vane according to claim 28, further comprising an underlying electroless Ni—P plating coating having from more than 5% by weight to 15% or less by weight of the P content, applied beneath the electroless Ni—P—B plating coating.

30. A vane according to claim 28 or 29, wherein said Ni—P—B plating coating contains from 1.5 to 3.6% by weight of P and from 0.02 to 0.03% by weight of B.

31. A vane according to claim 30, wherein said Ni—P—B plating coating has a hardness of from approximately Hv 700 to approximately Hv 1000.

32. A vane according to claim 31, wherein said aluminum alloy contains at least one element selected from the group consisting of from 0.1 to 1.0% by weight of Co and from 0.05 to 1.0% by weight of W.

33. A vane according to claim 28, wherein said aluminum alloy contains at least one element selected from the group consisting of from 0.1 to 1.0% by weight of Co and from 0.05 to 1.0% by weight of W.

34. A vane of a rotary compressor comprising:

an aluminum-alloy substrate having a sliding surface; and a shot-blasted electroless Ni—P—B plating coating containing from 0.05 to 5% by weight of P and from 0.01 to less than 0.05% by weight of B and formed on the sliding surface of the aluminum-alloy.

35. A vane according to claim 34, wherein the shot blasting is carried out by projecting grains, which have approximately the same hardness as or higher hardness than that of said electroless Ni—P—B plating coating, at a speed of 80 m/sec or more.

36. A vane according to claim 34 or 35, further comprising an underlying electroless Ni—P plating coating having from more than 5% by weight to 15% or less by weight of the P content, applied beneath the electroless Ni—P—B plating coating.

37. A vane according to claim 36, wherein said aluminum alloy contains at least one element selected from the group consisting of from 0.1 to 1.0% by weight of Co and from 0.5 to 1.0% by weight of W.

38. A vane according to claim 37, wherein said Ni—P—B plating coating contains from 1.5 to 3.6% by weight of P and from 0.02 to 0.03% by weight of B.

39. A vane according to claim 38, wherein said Ni—P—B plating coating has a hardness of from approximately Hv 700 to approximately Hv 1000.

40. A vane of a rotary compressor comprising:

an aluminum-alloy substrate having a sliding surface; and a laser-beam irradiated electroless Ni—P—B plating coating containing from 0.05 to 5% by weight of P and from 0.01 to less than 0.05% by weight of B and formed on the sliding surface of the aluminum-alloy substrate.

41. A vane according to claim 40, further comprising an underlying electroless Ni—P plating coating having from more than 5% by weight to 15% or less by weight of the P content, applied beneath the electroless Ni—P—B plating coating.

42. A vane according to claim 41, wherein said aluminum alloy contains at least one element selected from the group consisting of from 0.1 to 1.0% by weight of Co and from 0.05 to 1.0% by weight of W.

43. A vane according to claim 41 or 42, wherein said Ni—P—B plating coating contains from 1.5 to 3.6% by weight of P and from 0.02 to 0.03% by weight of B.

44. A vane according to claim 43, wherein said Ni—P—B plating coating has a hardness of from approximately Hv 700 to approximately Hv 1000.

45. A vane of a rotary compressor comprising:

an aluminum-alloy substrate having a sliding surface; and a high-frequency induction-heated electroless Ni—P—B plating coating containing from 0.05% by weight of P and from 0.01 to less than 0.05% by weight of B and formed on the sliding surface of the aluminum-alloy substrate.

46. A vane according to claim 45, further comprising an underlying electroless Ni—P plating coating having from more than 5% by weight to 15% or less by weight of the P content, applied beneath the electroless Ni—P—B plating coating.

47. A vane according to claim 46, wherein said aluminum alloy contains at least one element selected from the group consisting of from 0.1 to 1.0% by weight of Co and from 0.05 to 1.0% by weight of W.

48. A vane according to claim 46 or 47, wherein said Ni—P—B plating coating contains from 1.5 to 3.6% by weight of P and from 0.02 to 0.03% by weight of B.

49. A vane according to claim 48, wherein said Ni—P—B plating coating has a hardness of from approximately Hv 700 to approximately Hv 1000.

* * * * *